United States Patent Office 3,400,267
Patented Sept. 3, 1968

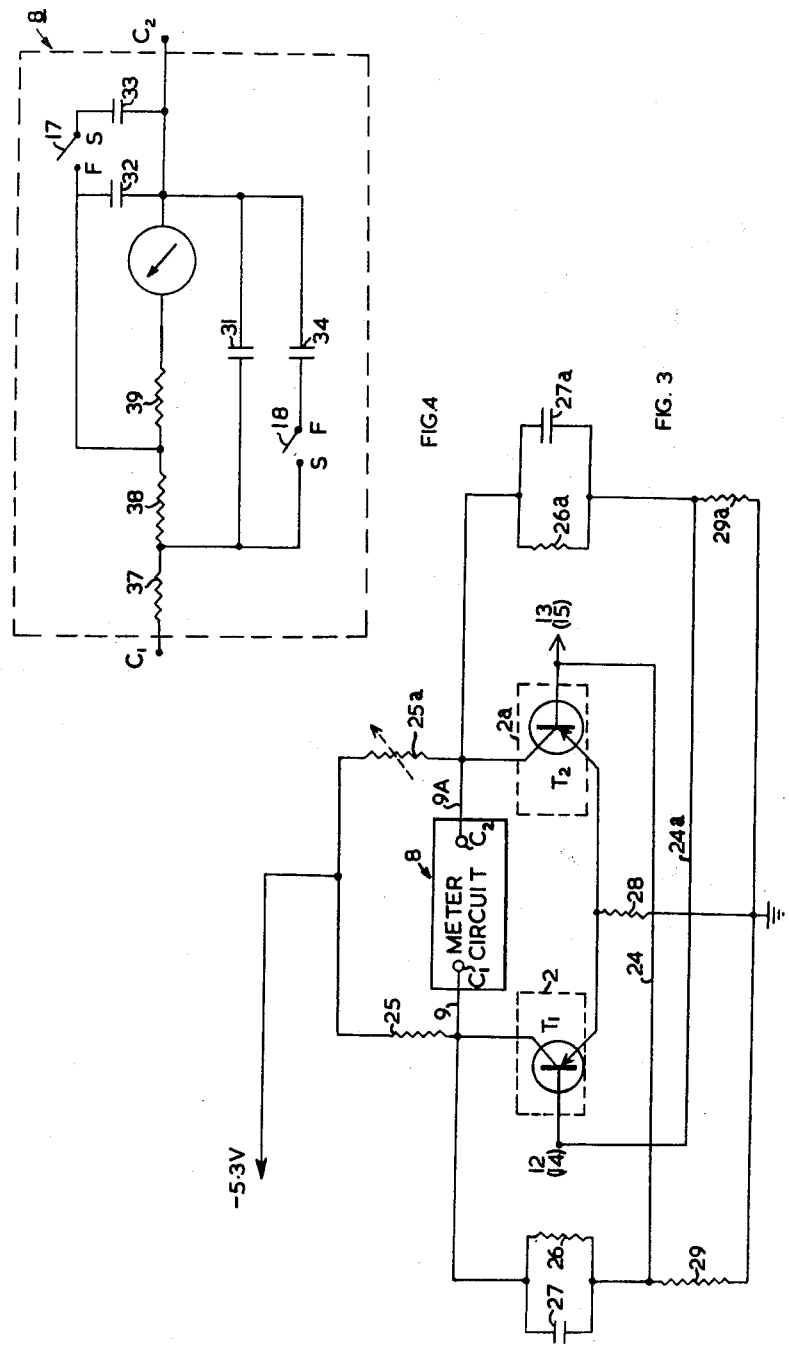

3,400,267
METHOD AND APPARATUS FOR RADIATION DIRECTION FINDING
Ronald W. Tolmie, Ottawa, Ontario, Canada, assignor to Atomic Energy of Canada Limited, Ottawa, Ontario, Canada
Continuation of application Ser. No. 296,229, July 19, 1963. This application Apr. 18, 1966, Ser. No. 543,434
5 Claims. (Cl. 250—83.3)

ABSTRACT OF THE DISCLOSURE

There is disclosed in the drawings and hereinafter specification a method and apparatus for determining the direction of emission of radiation from a radioactive body in such a way as to be independent of the intensity of the radiation therefrom. According to the method and the particular apparatus disclosed radiation is detected in at least two zones and signals are thereby generated that are representative of the radiation in each zone. The ratio of the signals is determined, and a resultant signal is produced. The resultant signal is utilized to drive an indicator having a pointer which indicator uses the resultant signal to cause the pointer to point at the source of radiation.

---

This application is a continuation of Ser. No. 296,229, filed July 19, 1963, now abandoned.

This invention relates to a method and apparatus for radiation direction finding designed to quickly determine, within very narrow limits, the direction from which a radiation beam is coming. The radiation direction finder (hereinafter referred to as RDF), may be used for finding the direction of radiation from gamma, beta, alpha, neutron and other sources, and for detecting the direction of reflections of such radiations from reflecting media.

Prior known devices of this type have exhibited characteristics such that the sensitivity, to changes in direction of the detector in relation to the actual direction between the detector and the specimen, has been lowest when departures from the true direction have been small. The effect has been that the precise location of a source of radiation or the direction of a reflection of such a source, has been particularly difficult and any such sensitivity inherent in particular designs, has not been used to the best advantage.

It is an object of this invention to provide an accurate method for determining the direction of a radiating source or the direction of a reflection of a radiation source.

It is a further object of this invention to provide an RDF which has a true sense of direction. That is, its associated indicator will read on one side of the center of its scale when the source or reflection, being investigated, is on the same side of the axis of the detector, and similarly, the indicator will read on the other side of the center scale when the source or reflection is moved to the other side of the axis of the detector.

It is another object of the invention to provide an RDF which has a maximum sensitivity, to direction, when the detector is facing or pointing at the source or reflection.

It is a further object of this invention to provide an RDF whose indicator reading is substantially independent of the strength of the radiation field.

The invention consists of a radiation direction finder, comprising, a pair of counting tubes disposed each side of a plane of symmetry, a radiation shield, substantially symmetrically disposed on said plane, and located between said tubes, and adapted to reduce the counting rate on the said tubes when a radioactive source or reflection is located to one side of the said plane, a ratio circuit connected to said tubes and adapted, firstly, to produce an output signal voltage which is zero when the counting rates of the tubes are substantially equal, and, secondly, to produce an output signal voltage having a first polarity when a said one of said tubes has a higher counting rate of the two tubes and an output signal voltage of opposite polarity when the other of said tubes has the higher counting rate of the two tubes, and indicating means connected to receive said output signal, said indicating means including a needle to point substantially towards the source or reflection of said radiation. The invention further consists in a method for detecting the direction of an emission of radioactive radiation comprising the steps of: dividing the emission of said radioactive radiation into two zones by a plane of division, where said plane of division reduces the transfer of radiation from one zone to the other, detecting the radiation count rate in each zone, deriving the relative count rates between the two zones and producing an electric signal whose polarity is indicative the respective zone having the higher count rate, utilizing said signal to directionally indicate in which of the two zones the higher count rate exists, and rotating said plane of division until said signal directionally indicates that the said plane and the said direction of emission are in alignment.

The instrument has particular advantage in the location of low level gamma sources or reflections for which its ability to determine directions accurately from a distance, and, in spite of intervening obstructions placed between it and the source or reflection.

Other obvious applications are in locating contamination around nuclear reactors or where radioactive sources are used and in military application for determining "hot spots" or fall-out. With an external probe having a high sensitivity, the instrument should be very useful in pinpointing lodes of radioactive ores. Another interesting application is in conjunction with a source, for example, gamma, contained within and emitting from the probe, radiation from the source may be scattered back to the detector, from a reflecting medium, so that the probe will indicate the position of the scattering object, which thus need not, of itself, be radioactive. Further advantages of this invention will be in locating pipes in walls, looking for seams in mines, etc. The counting device in the associated radiation absorbing field may be mounted on a probe and electrically connected to a ratio circuit. This has a further advantage that the probe may be compact and light in weight. The RDF may be used for prospecting from the air as well as from the ground. The invention is also advantageous in certain medical uses such as the locating of obstructions and malignancies, which can be caused to collect a concentration of a radioactive tracer. Also, where patients may have had transducer cells, containing a small amount of a gamma emitting radioisotope, introduced into areas of investigation, the transducer cells may be located, by means of the RDF herein disclosed. A preferred embodiment of the invention will now be described in accordance with the accompanying drawings in which:

FIG. 3 shows the electrical connections for the ratio circuit;

FIG. 4 shows the electrical connections for the meter circuit;

Figure 1:
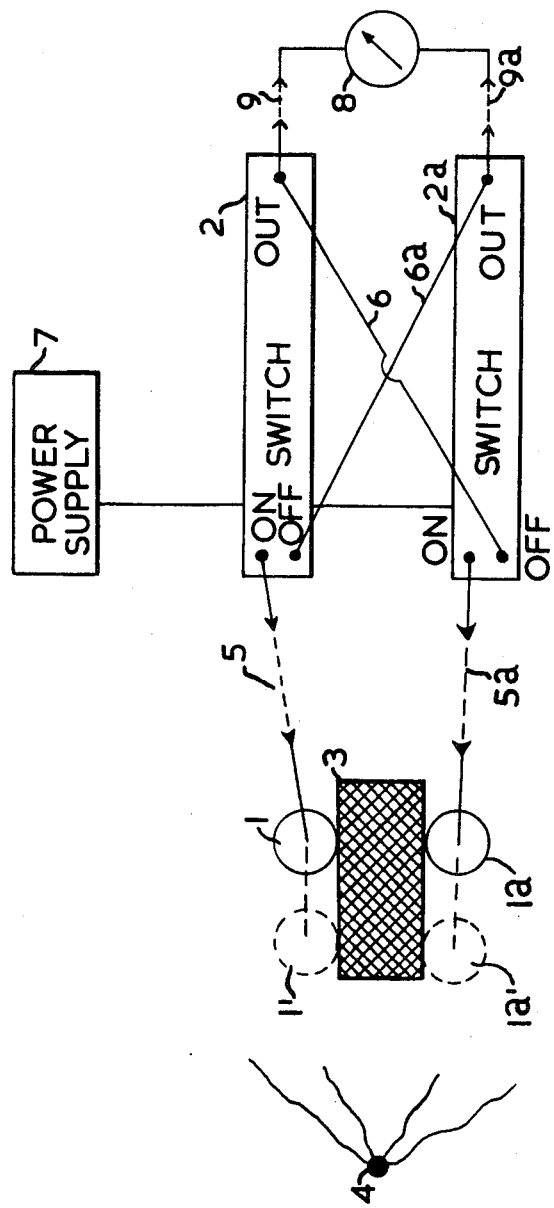
FIG. 1 is a diagram showing the position of the various elements of the radiation direction finder.

Referring now to FIG. 1, 1 and 1a indicate a pair of counting tubes within a probe and which are each connected to associated switching means 2 and 2a by means of connections 5 and 5a. Between the counting tubes, 1 and 1a, there is placed a radiation absorbing shield 3 which lies substantially on the plane of symmetry of the radiation direction finder, the counting tubes and shield constituting a probe. The two counting tubes are substantially symmetrically spaced each side of the plane of symmetry of the probe. As shown, the probe is activated by a radioactive source 4 which, for convenience, is shown on the plane of symmetry. The counting tubes, which are connected to associated switch means by connectors 5 and 5a, may be at a distance from the switch means 2 and 2a. The switch means 2 and 2a, are interconnected by connections 6 and 6a whose purpose will be hereinafter described. The switches are energized by a power supply 7, which will be described hereinafter, and which also provides a high voltage supply for the counting tubes 1 and 1a. Connected across switches 2 and 2a is an indicator 8 to be hereinafter described. The indicating device 8 includes a pointer or needle and is connected to the switches by connections 9 and 9a, and may be located remotely from the switching means. As will be seen in FIG. 1, a pair of additional counting tubes 1' and 1a' may be added, as shown, to extend the range of operation of the probe as will be hereinafter described. Connections 6 and 6a are included so that conduction through one switch is arranged to turn the other switch off at that moment, as will be described hereinafter. The counting tubes 1 and 1a and the radiation absorbing tube 3, together forming the probe, may be remote from the switching unit and connected thereto by means of leads 5 and 5a.

Figure 2:
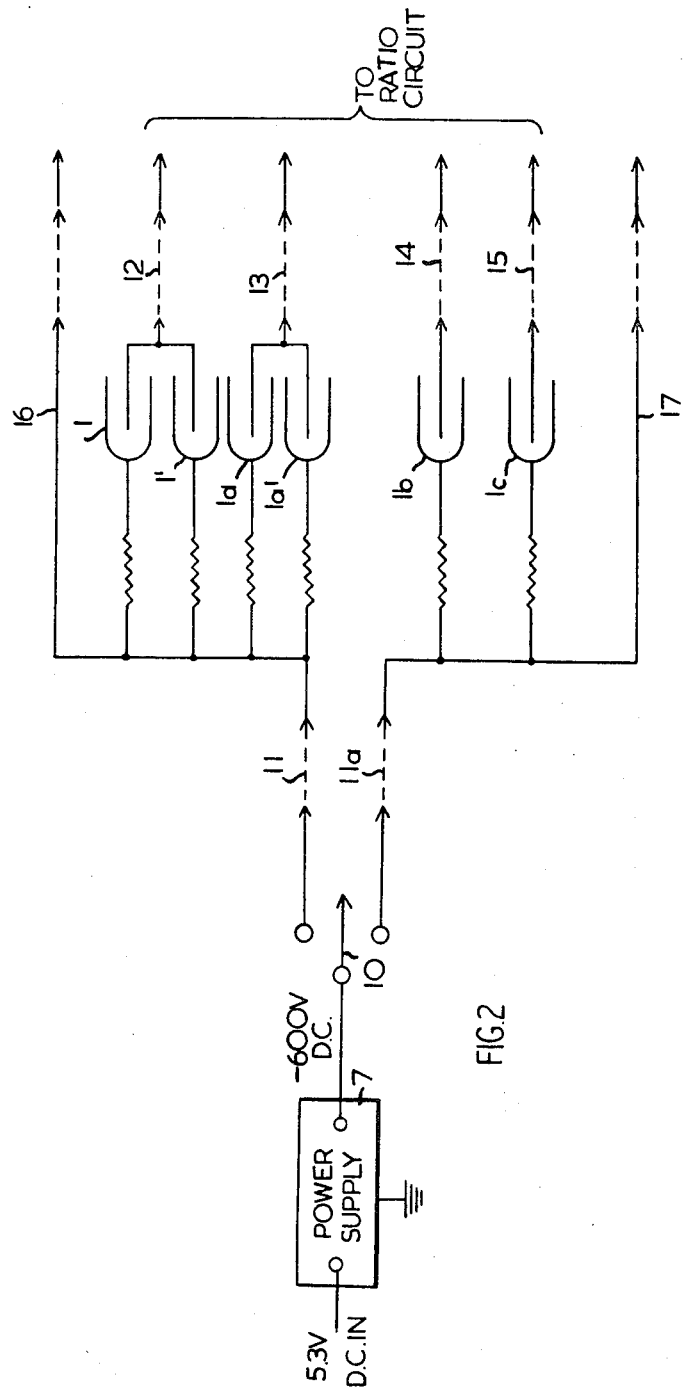
FIG. 2 shows the connections between a power supply and the counting tubes.

FIG. 2 shows the connections between a power supply 7 and the counting tubes 1, 1', 1a and 1a' by means of connections 11 and 11a. In this embodiment, the four tubes, hereinbefore referred to, are type number 18504, manufactured by Philips Electro Devices, Ltd. Should it be necessary to provide a probe having a lower count rate, a pair of counting tubes, type 18529, also manufactured by Philips Electro Devices, Ltd., indicated at 1b and 1c, may be put into operation by means of selector switch 10, and connected thereto by connector 11a. Connections 12, 13, 14 and 15 pass to the ratio circuit to be hereinafter described. The probe may be internal to the ratio circuit means, to be hereinafter described. Alternatively, the probe may be separated and electrically connected to the ratio circuit. In the former case, an additional external probe may be provided and connections 16 and 17 are included to provide for this.

Referring now to FIG. 3, which shows the ratio circuit, transistors T1 and T2, form the switches 2 and 2a in FIG. 1. Connector 12, from the radiation counters 1 and 1' are joined to the base of transistor T1 and the connector 13 from the radiation counters 1a and 1a' are connected to the base of transistor T2. Alternatively, the radiation counting tubes 1b and 1c may be connected, likewise, by connectors 14 and 15 to the base of transistors T1 and T2 respectively.

A pulse from one of the radiation counter tubes on one side, will cause the corresponding transistor to conduct. This lowers the potential on its collector, so that the current through cross-connections 24 and 24a (via the associated potential dividers 25, 26 and 25a and 26a) which previously held the other transistor in the conducting stage, is removed, so that the other transistor consequently stops conducting, and the potential on its collector rises to a point where a current through the other potential divider holds the other transistor in its conducting state. Thus, as shown in the diagram, a pulse from a given detector turns on its corresponding transistor and turns the other transistor "off." The common emitter resistance 28 insures that only one or other of the transistors will conduct. The capacitors 27 and 27a on the potential dividers increase the currents during the switching operations to provide faster and more positive operation. Resistors 29 and 29a establish the necessary base voltages.

Switches 2 and 2a are switched "on" (applying power to the output) by pulses from the radiation counters. Either one is switched off when a signal appears at the output of the other, as described hereinbefore.

When the source or reflection is in line with the axis of the shield as shown, the count rate is the same from both counters so the switches are on for the same fraction of the time and hence the meter reads zero.

If the source or reflection is off the axis of the shield, one of the detectors is partly shielded from the radiation, so it will be on a smaller fraction of the time and since the average output voltage is therefore less, the meter will deflect. If the meter has a fixed alignment with respect to the shielding detector assembly, the direction of the meter deflection can indicate the direction in which the source lies.

The potential at each collector switches between two values corresponding to the "on" and "off" states. The average potential is $$V_{avg} = (V_{off} - V_{on}) \left( \frac{N_1}{N_1 + N_2} \right)$$

where $N_1$ is the pulse frequency from one detector and $N_2$ is the pulse frequency from the other. The meter is connected between the two collectors and has a filter which averages the potentials, so the current through the meter is proportional to the average potential difference between the collectors.

$$V_{avg} \text{ (across meter)} = (V_{off_1} - V_{on_1}) \cdot$$

$$\left( \frac{N_1}{N_1 + N_2} \right) - (V_{off_2} - V_{on_2}) \cdot \left( \frac{N_2}{N_1 + N_2} \right)$$

It can be seen that the meter will be balanced at the zero point when the pulse frequency from the two detectors is the same, if the potential difference $(V_{off} - V_{on})$ is the same for both transistors. This last condition is achieved by making the collector resistance of one of the transistors variable, so it can be adjusted to compensate for slight differences in either the transistors or in the detectors.

FIG. 4 shows the indicator circuit labelled at 8 in FIG. 3. The connections in the indicator circuit are self-explanatory except that a pair of switches 17 and 18 are included to change the counting ranges of the filters comprising the resistors and capacitors. Capacitors 31 and 32 are appropriate to set the counting rate. When the switches are closed, additional capacitances 33 and 34 are introduced into the two legs of the circuits for use when the counting rate is slow. Potential divider means 37, 38 and 39, are included to establish the voltages across the filter network.

Figure 5:
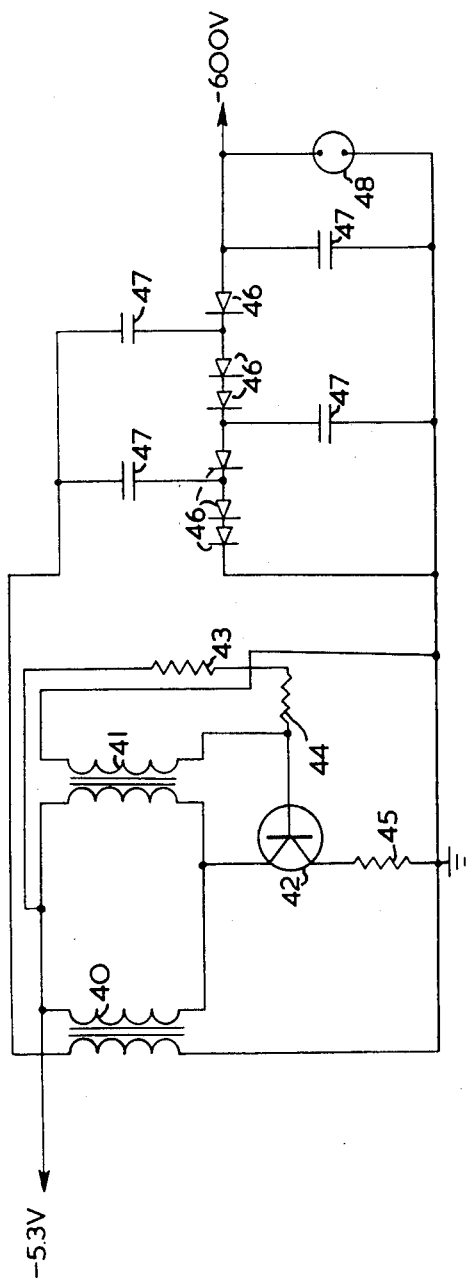
FIG. 5 shows the electrical connections for power circuit.

FIG. 5 indicates the power supply which consists of a pair of transformers 40 and 41 and a transistor 42, which, in conjunction with the resistors 43, 44, and 45 provide the necessary alternating current in the two transformers, for transformation purposes, and the output is substantially rectified and smoothed by diodes 46, and capacitors 47 respectively, to provide a 600 volt output for energizing the counting tubes. Voltage stabilizer 48 is connected between the output and ground.

In all the circuits hereinbefore described, it would be obvious to one skilled in the art to replace each or all the transistors or diodes with thermionic equivalents and to adjust the circuit constants appropriately.

Figure 6:
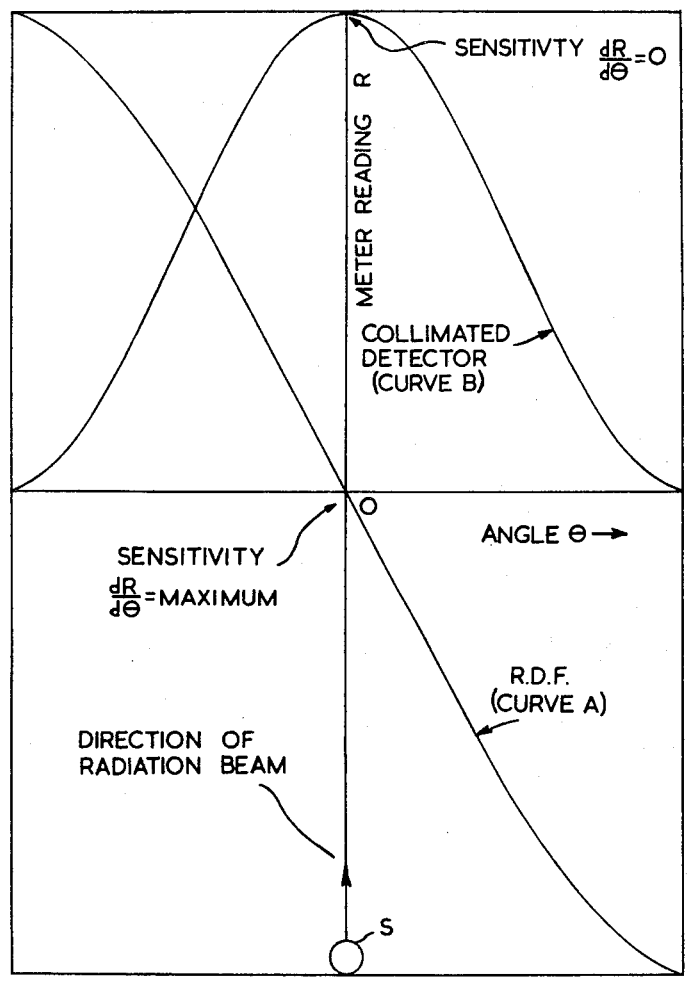
FIG. 6 is a graph showing the directional characteristics of the RDF.

Referring now to the graph shown in FIG. 6, the graph illustrates three advantages of this instrument as compared to a collimated detector with a shield (that is, contrary to the conventional technique of determining radiation direction). The graph is a plot of the meter reading versus angle, as a detector is rotated in a radiation field from a source, or reflection, indicated at S, some distance away. Curve A shows the sensitivity characteristics of the RDF of the present invention. Curve B shows the corresponding characteristics of the conventional prior known type of radiation direction finder. The important advantages are:

(1) The RDF has a true sense of direction. Its meter will read on one side of center scale when the source or reflection is on the same side as the axis of symmetry of the probe and on the other side of the scale when the source or reflection is moved to the other side of the axis of symmetry of the probe. With a collimated detector, on the other hand, the reading merely goes up and down, as the source or reflection is moved through the same arc. Using the collimated detector, direction finding is, therefore, a comparatively clumsy trial and error process.

(2) The slope of the curve, $dR/d\theta$ is a maximum when the RDF is pointing at the source or reflection. The slope of the curve B of the collimated detector is zero at this point. This means that the RDF of the present invention, will detect small movements of the source or reflection or detector whereas the collimated detector be totally insensitive to such movements at this point. This also makes the RDF much more easy to use and permits a higher precision in determining the exact direction of the radiation.

(3) The deflection from the center point of the indicator is approximately proportional to the amount by which the source is off the detector's plane of symmetry (i.e., $dR/d\theta$ is approximately constant over a substantial range of arc). This again makes the RDF easy and natural to use. It means that the detector can be designed so that if the instrument is placed in a radiation field, its indicator needle will point in the actual direction of the field, thus completely eliminating trial and error searching for the radiation direction. This sense of direction is normally restricted to a 180° arc, and the direction indicated is approximate except for the center line, at which point, the error is substantially zero. (The reason for the off axis reduction in the accuracy of the direction finding ability, is that the slope of the graph depends on the energy of the radiation.)

(4) A fourth major advantage which might be found in the graph is that the meter reading is independent the strength of the radiation field. The reading obtained with a collimated detector is obviously a function of the field strength as well as the radiation direction.

From the foregoing, it will be seen that the emission of radiation is in effect divided into two zones by a plane of division, and further that the region defined by said plane reduces the count rate of any radiation activity passing through the said plane. Having detected the count rate in each zone and comparing the respective count rates, a signal is thereby derived, whose polarity is indicative of the particular zone having the higher count rate of the two zones. If, therefore, the direction of emission remains fixed in space, it is only necessary that the plane of division be rotated, relative to the direction of emission, until the count rate of the two sides of the plane is substantially equal, at which condition the plane of division is aligned with the direction of emission. At any time during the process of alignment of the said plane, the signal is adapted not only to indicate on which side of the plane the emission is approaching, but to actually point to the direction of emission. In the above method, the emission was assumed to be radiating from a primary source. It will be shown hereinafter that the same method of radiation direction finding may be used for reflections of radiation.

In FIG. 1, the counting tubes 1 and 1' and 1a and 1a' were arranged substantially parallel to the axis of symmetry. These may, however, be arranged on a line substantially perpendicular to the plane of symmetry, thus giving a change in sensitivity without altering substantially, the directional characteristics. The radiation absorbing shield 3 may be approximately 1 centimetre in thickness at the mid position and the configuration varied to suit the counting tubes used or the directional characteristics desired. The shield should preferably be as elongate as space permits.

Figure 7:
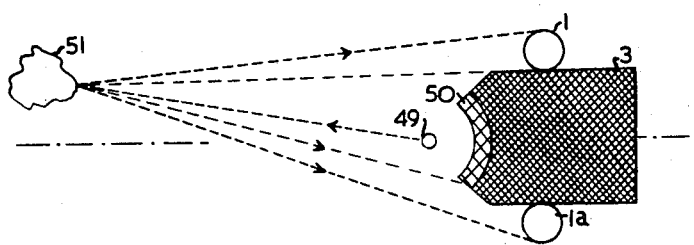
FIG. 7 is a diagram showing the various elements of an RDF probe having a source of radiation contained therein.

In FIG. 7 there is shown an arrangement where a primary radiation source 49 is placed adjacent the radiation absorbing shield 3 and between it and a reflecting medium 51, whose position it is desired to establish. An additional shield 50 is placed behind the primary source 49 to prevent direct exposure of the counting tubes, to the primary source 49. Any radiation away from the probe may then be reflected by a medium at 51 whose position may then be established by the technique hereinbefore described. Calibration of the instrument may be carried out by placing a source on the axis of symmetry and either rotating the radiation absorbing shield 3 about an axis in this plane, or by moving the counting tube or tubes on one or both sides, inwardly or outwardly, or towards or away from the radiation source or reflector.

Other embodiments of the invention could include automatically variable time constants, in the circuits, and thereby adapted for variations in the rates of emission of the radiating source. This may be arranged to retain the instrument at its high sensitivity or angular resolving power regardless of the rates of emission of the radiating sources. Calibration may also be accomplished by varying resistors 25 and 25a. In the embodiment, illustrated, the following component values were used:

| | | |
|---|---|---|
| R18 | ohms | 10M |
| R19 | do | 10M |
| R20 | do | 10M |
| R21 | do | 10M |
| R22 | do | 1M |
| R23 | do | 1M |
| R25 | do | 21.2K |
| R25a | do | 5.2K |
| R26 | do | 180K |
| R26a | do | 180K |
| R28 | do | 220K |
| R29 | do | 100K |
| R29a | do | 100K |
| R36 | do | 11.5K |
| R37 | do | 3.3K |
| R38 | do | 3.3K |
| R39 | do | 2.2K |
| R43 | do | 10K |
| R44 | do | 2.2K |
| R45 | do | 50 |
| C27 | pfd | 500 |
| C27a | pfd | 500 |
| C31 | mfd | 100 |
| C32 | mfd | 100 |
| C33 | mfd | 1000 |
| C34 | mfd | 1000 |
| C47 | mfd | 0.02 |

Counting Tubes, either Two or Four, Type 18504 or Two, Type 18529, manufactured by Philips Electro Devices Ltd.

Indicator Meter 0–50 micro-amp (centre-zero)

Transistors $T_1$, $T_2$ Type OC77

I claim:

1. The method of detecting the direction of emission of radioactive radiation comprising the steps of:
   (i) dividing the emission of said radioactive radiation into two zones by a plane of division, said plane of division reducing the transfer of radiation from one zone to the other;
   (ii) detecting the radiation count rate in each zone;
   (iii) deriving the count rates in the two zones and determining the ratio of these count rates to produce an electric signal whose polarity is indicative of the respective zone having the higher count rate;
   (iv) utilizing said signal to directionally indicate in which of the two zones the higher count rate exists; and (v) rotating said palne of division until said signal directionally indicates that the said plane and said direction of emission are in alignment.

2. A radiation direction finder comprising at least one pair of counting means disposed one on each side of a plane of symmetry, a radiation reducing shield substantially symmetrically disposed on said plane, said counting means being disposed on opposite sides of said radiation reducing shield, said shield being adapted to reduce the counting rate of one of said counting means when a radioactive emission is located on one side of said plane, comparison means to compare the count from one counting means to the count from the other of said counting means to provide a signal which is a function of the ratio between said counts, said comparison means being means connected to each said counting means and adapted firstly to produce an output signal voltage which is zero when the count of each of the counting means is substantially equal and secondly to produce an output signal voltage having a first polarity when one of said counting means has the higher count, and an output signal of opposite polarity when the other of said counting means has the higher count, indicating means connnected to receive said output signal, said indicating means including a needle adapted to point towards the source of radiation.

3. The apparatus of claim 2 wherein said counting tubes disposed on opposite sides of said plane and disposed on opposite sides of said radiation reducing shield are remotely disposed from and electrically connected to said ratio means.

4. The apparatus of claim 2 wherein said indicating means is remotely disposed from and electrically connected to said ratio means.

5. The apparats of claim 2 wherein said ratio means includes a flip-flop circuit.

References Cited

UNITED STATES PATENTS 3,291,989 12/1966 Campanella _____ 250—83.3
3,291,990 12/1966 Lentz _____ 250—83.3

ARCHIE R. BORCHELT, *Primary Examiner.*